Patented Nov. 20, 1934

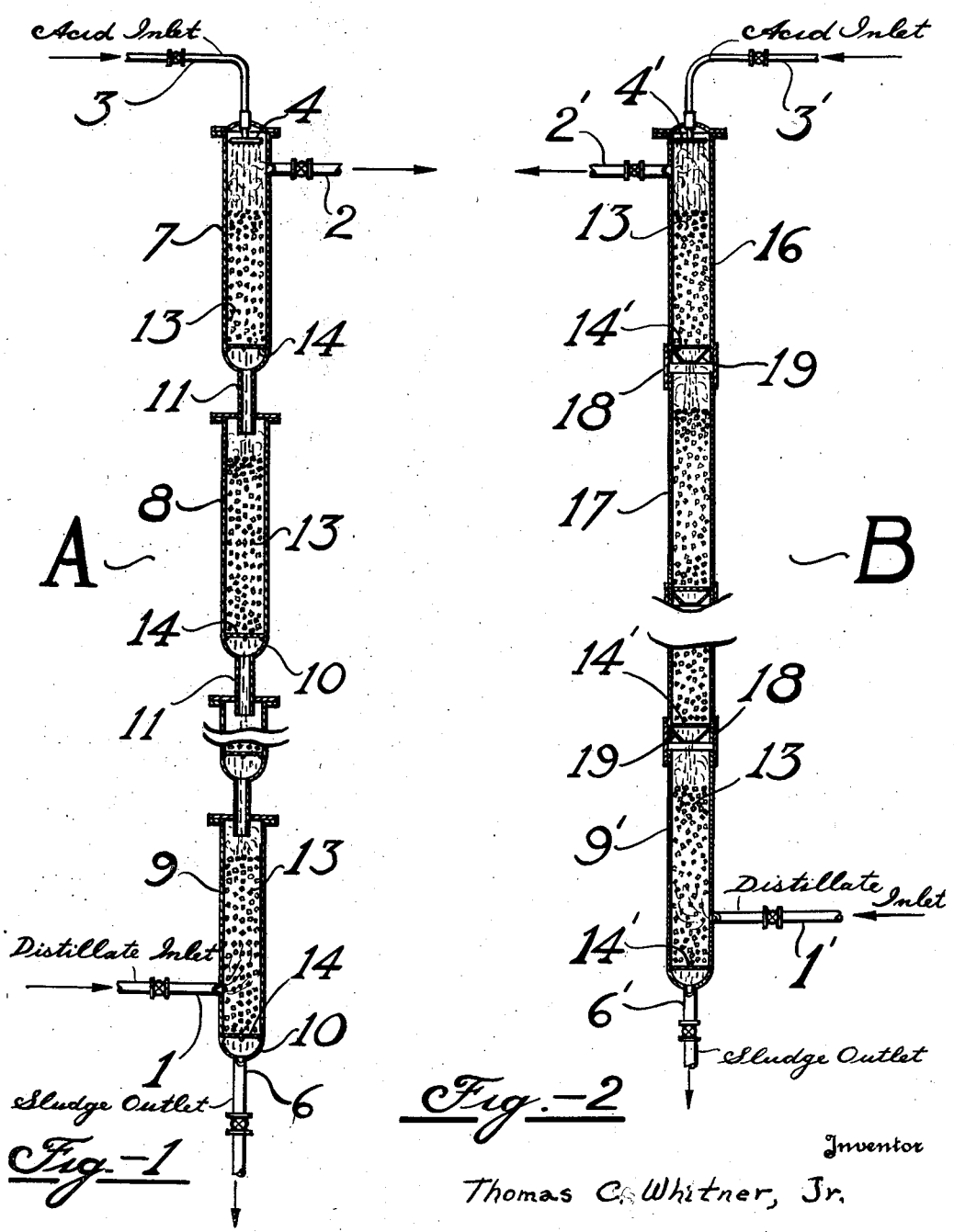

1,981,818

UNITED STATES PATENT OFFICE 1,981,818

APPARATUS FOR COUNTER-CURRENT TREATMENT OF TWO IMMISCIBLE LIQUIDS

Thomas C. Whitner, Jr., Elizabeth, N. J., assignor to Standard Oil Development Company, a corporation of Delaware Application February 21, 1931, Serial No. 517,549

2 Claims. (Cl. 196—46)

This invention relates to improvements in the counter-current treatment of fluids.

The invention will be fully understood from the following description taken in connection with the accompanying drawing in which latter—

Fig. 1 is a longitudinal sectional view through a preferred form of apparatus, and Fig. 2 is a longitudinal sectional view through a modified form of apparatus.

Referring particularly to Fig. 1, a tower A is shown through which liquids of different specific gravities are adapted to be passed in contact with each other in counter-current treatment. The relatively light liquid is introduced into the bottom of the tower through a valved line 1 and is withdrawn from the top of the tower through a valved line 2. The relatively light liquid will be described as a petroleum oil such as a petroleum distillate although it will be understood that other liquids may be similarly treated. A relatively heavy liquid is injected preferably in divided form into the top of the tower through a valved line 3 and spray device 4 which introduces the relatively heavy liquid into the tower in spaced relation to the side walls of the tower. The process will be described as applied to the acid treating of the petroleum distillate and the relatively heavy liquid used is preferably concentrated sulfuric acid for this purpose. The relatively heavy acid flows downwardly through the tower in contact with the petroleum distillate and is discharged from the bottom of the tower together with any sludge through a valved line 6. The approximate proportions of concentrated sulfuric acid and petroleum distillate which may be used in the preferred form of carrying out this process are approximately eight volumes of concentrated sulfuric acid to approximately one thousand volumes of petroleum distillate. The liquids can be used in widely varying proportions if desired.

The tower is preferably formed in a plurality of super-imposed sections such as have been designated 7, 8 and 9. The bottom of each section converges at 10 to a centrally disposed discharge opening which communicates with a pipe 11 which opens thru a substantially central portion of the top wall of the next lower section. Pipe 11 terminates in spaced relation to said top wall. The relatively heavy acid which normally has a tendency to flow toward the side-walls of the tower is therefore at intervals directed from the side-walls of the tower toward a central portion of the tower and thereby intimate intermixture of the liquids is facilitated.

A plurality of layers 13 of granular material extending across the tower are disposed in the tower. These layers are each supported upon a perforated plate 14. The granular material may be formed of pebbles, glass beads, or of other material which is substantially inert to the liquids passed through the tower. The granules are of a suitable size to facilitate the intermixture of the liquids.

Referring particularly to Fig. 2, a modified form of apparatus for carrying out the invention is shown comprising a tower formed in sections such as 16 and 17 which are connected by a sleeve 18. Guide means for directing the relatively heavy liquid from the side-walls of the tower to a central portion of a given area of the tower comprise a circular flange 19 of frustro conical shape the outer edge of which engages the side-walls of the tower and which converges downwardly to a central discharge opening. Layers 13 of granular material, as previously described, are disposed in the tower and are supported, as previously described, by perforated plates 14'. The liquids to be treated are introduced into and passed through the tower in the same manner as described in connection with Fig. 1.

Various changes may be made within the scope of the appended claims in which it is desired to claim all novelty inherent in the invention as broadly as the prior art permits.

I claim:

1. Counter-current treating apparatus adapted for intimately contacting two immiscible liquids of different specific gravity passing in counter-current flow through the apparatus without the aid of external means for contacting the two liquids after they have been introduced into the apparatus comprising a substantially vertically disposed tower, means for introducing a relatively light liquid into the bottom of the tower and means for withdrawing it at the top, means for introducing a relatively heavy liquid into the top of the tower in divided form and means for withdrawing it at the bottom, the tower being formed in super-imposed sections, a conduit connecting the bottom of each section with a central portion of the top of the next lower section and terminating in spaced relation to said top, the tower containing layers of granular material extending across the tower above each conduit.

2. Counter-current treating apparatus adapted for intimately contacting two immiscible liquids of different specific gravity passing in countercurrent flow through the apparatus without the aid of external means for contacting the two liquids after they have been introduced into the apparatus comprising a substantially vertically disposed tower, means for introducing a relatively light liquid into the bottom of the tower and means for withdrawing it at the top, means for introducing a relatively heavy liquid into the top of the tower in divided form and means for withdrawing it at the bottom, the tower being formed in super-imposed sections, the bottom of each section converging toward a central opening, a conduit connecting the opening with the central portion of the top of the next lower section, the tower containing layers of granular material extending across the tower above each conduit.

THOMAS C. WHITNER, Jr.